Figure 9:
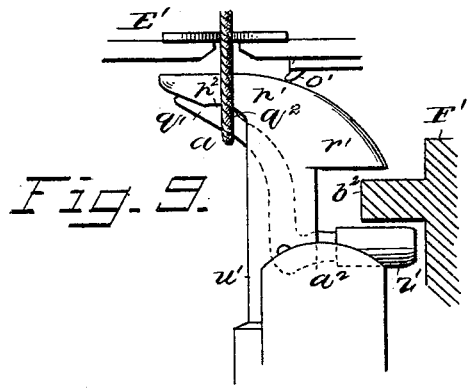

(Model.)
6 Sheets—Sheet 1.
P. J. OLSON.
MACHINE FOR BINDING GRAIN.
No. 273,760. Patented Mar. 13, 1883.
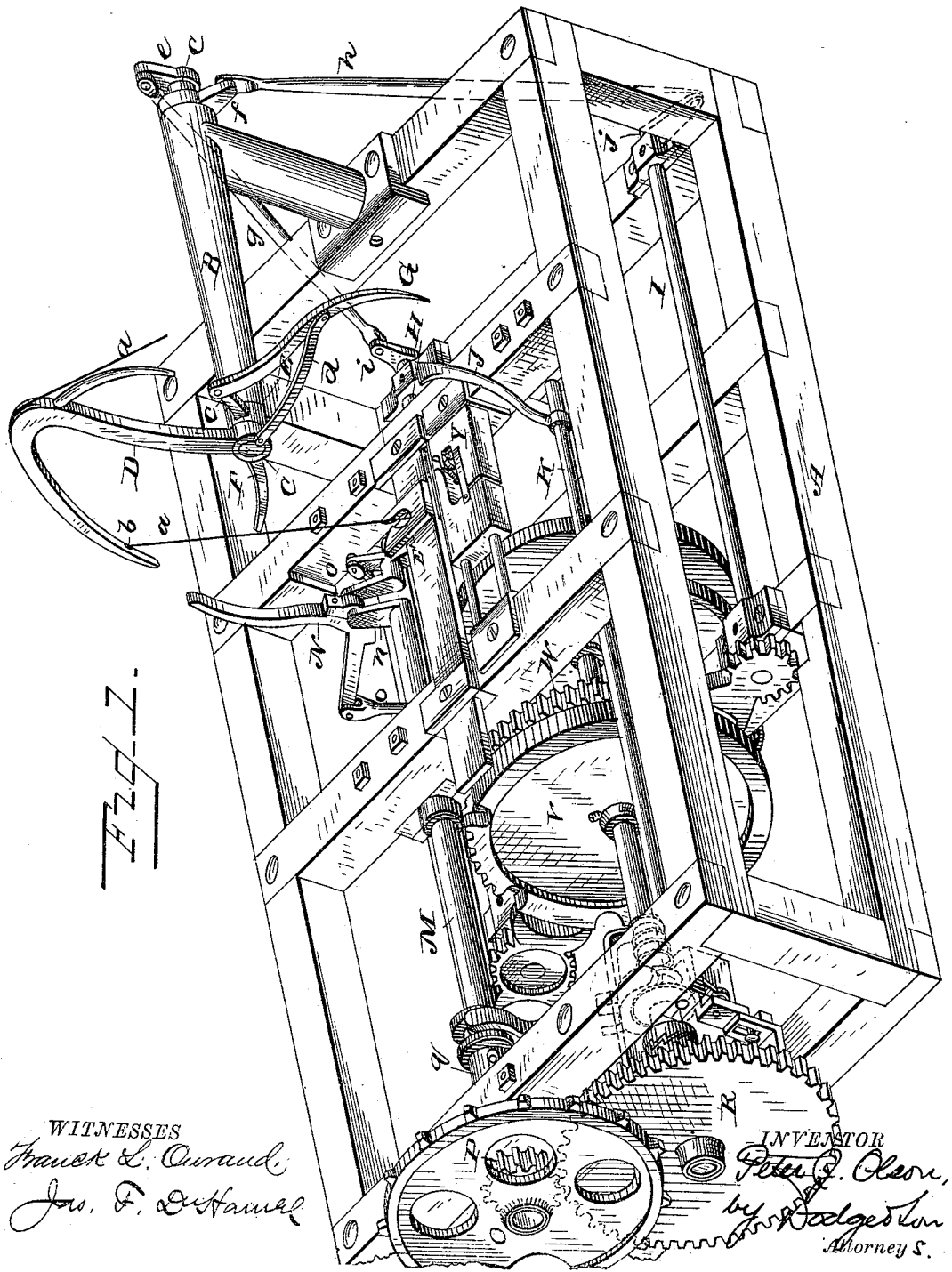
WITNESSES
INVENTOR (Model.)
6 Sheets—Sheet 2.
P. J. OLSON.
MACHINE FOR BINDING GRAIN.
No. 273,760.  Patented Mar. 13, 1883.
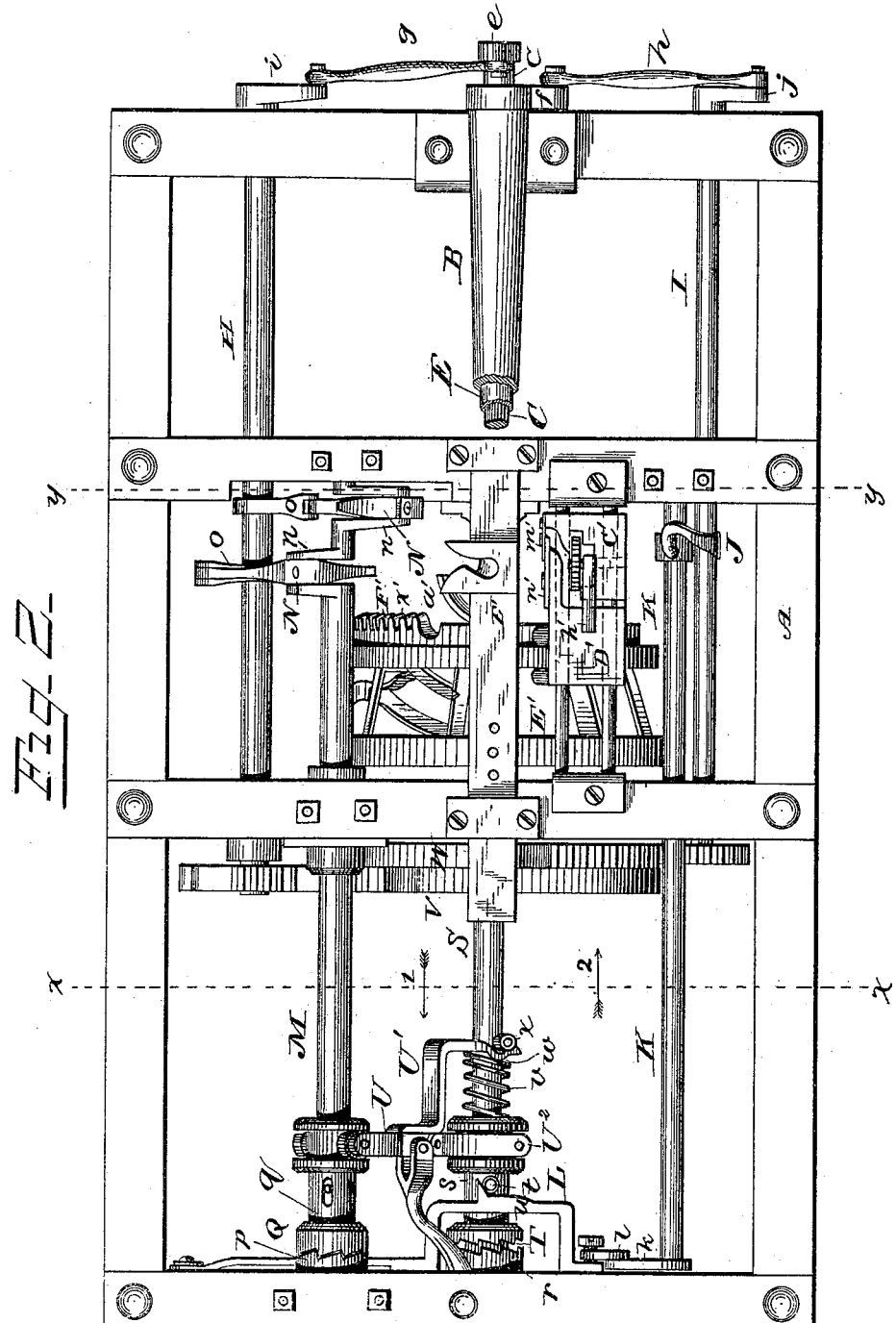
WITNESSES
Franck L. Ourand
Jas. F. DuHamel
INVENTOR
Peter J. Olson,
by Dodge & Son,
Attorneys.

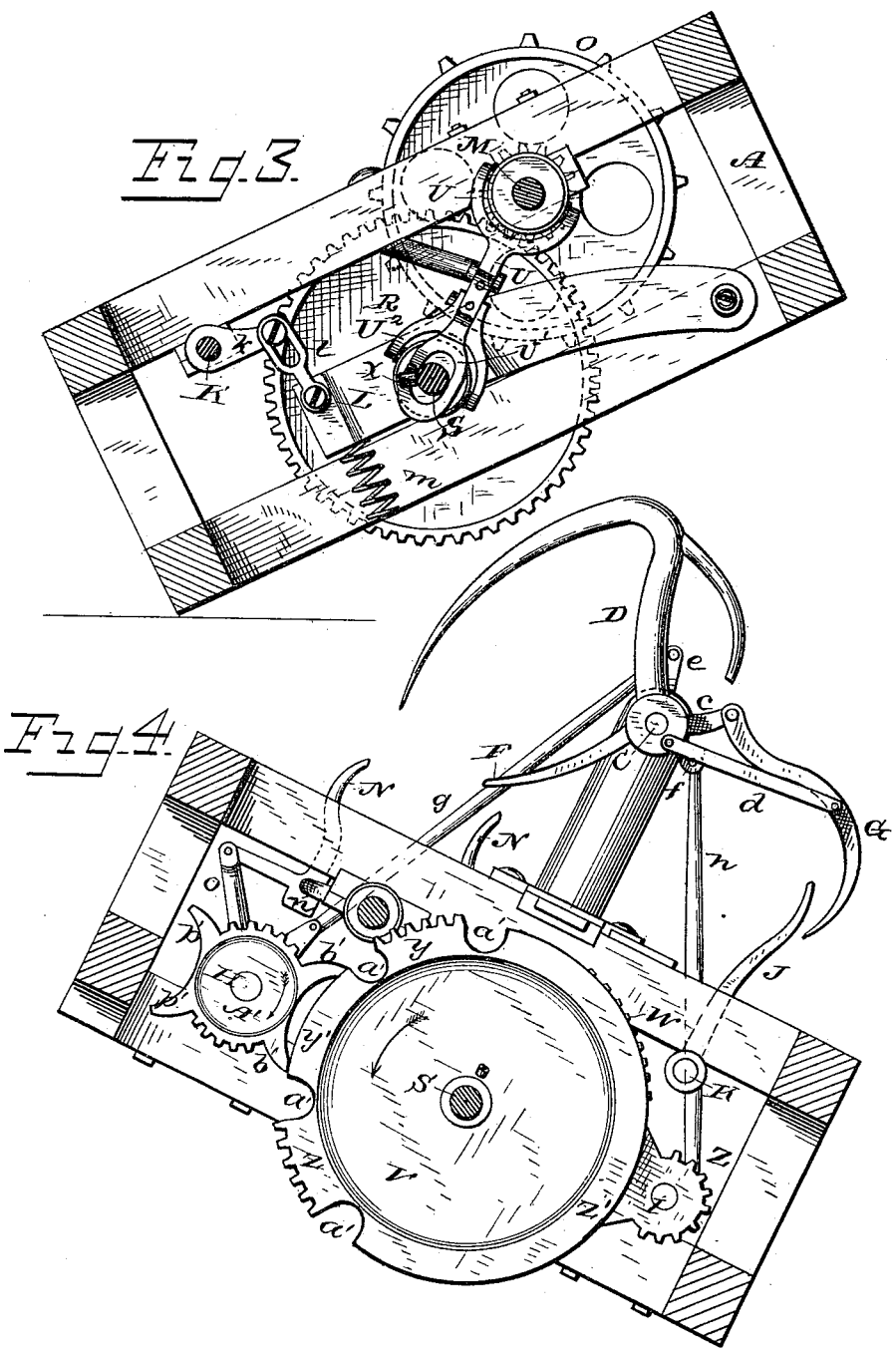

(Model.)
P. J. OLSON.
MACHINE FOR BINDING GRAIN.
No. 273,760. Patented Mar. 13, 1883.
6 Sheets—Sheet 4.
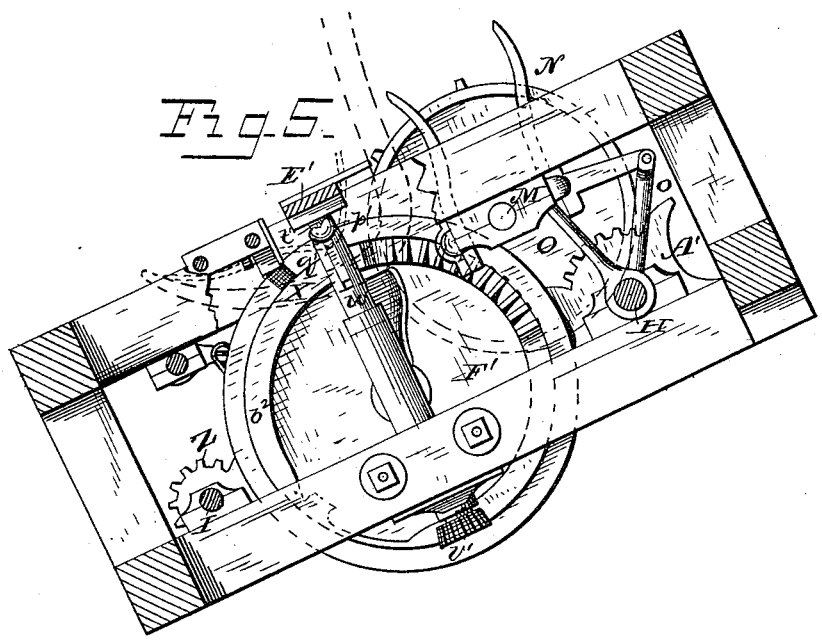
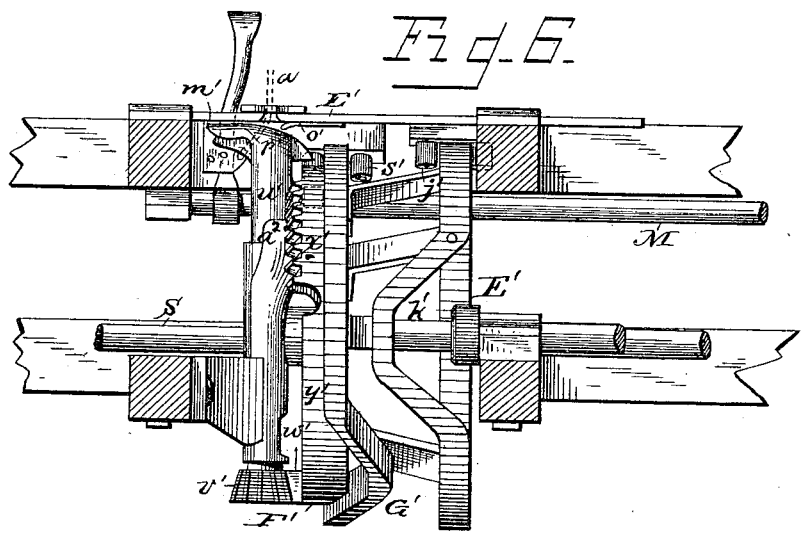
WITNESSES
Franck L. Ourand
Jas. F. DeHamel
INVENTOR
Peter J. Olson,
by Dodge Son,
Attorneys (Model.) P. J. OLSON. 6 Sheets—Sheet 5.
MACHINE FOR BINDING GRAIN.
No. 273,760. Patented Mar. 13, 1883.
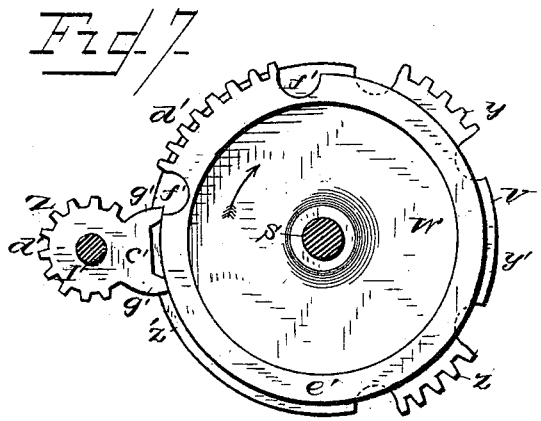
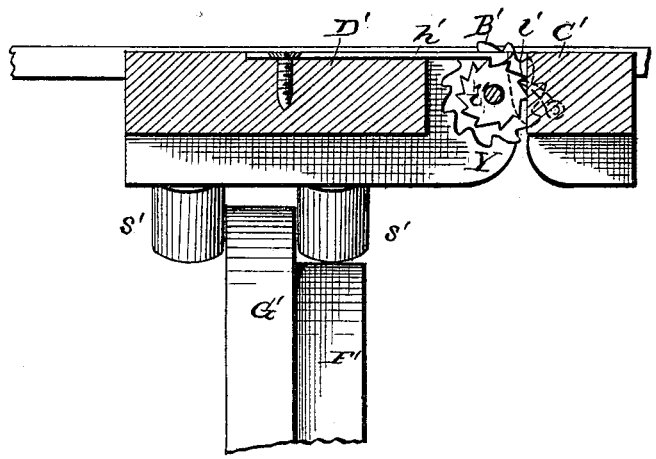
WITNESSES
INVENTOR (Model.)

P. J. OLSON.

MACHINE FOR BINDING GRAIN.

No. 273,760.  Patented Mar. 13, 1883.

6 Sheets—Sheet 6.

WITNESSES:
Geo. B. Fryl.
Jas. T. DuHamel

INVENTOR:
Peter J. Olson,
by Dodge & Son,
Attys.

UNITED STATES PATENT OFFICE.

PETER J. OLSON, OF NORTHFIELD, MINNESOTA, ASSIGNOR OF ONE-HALF TO ARTHUR E. BOWE AND CHARLES R. COOK, BOTH OF SAME PLACE.

MACHINE FOR BINDING GRAIN.

SPECIFICATION forming part of Letters Patent No. 273,760, dated March 13, 1883.

Application filed August 15, 1882. (Model.)

*To all whom it may concern:*

Be it known that I, PETER J. OLSON, of Northfield, in the county of Rice and State of Minnesota, have invented certain Improvements in Machines for Binding Grain, of which the following is a specification.

My invention relates to machines for binding grain, and more particularly to such as employ a trip actuated by the pressure of the grain to start the band applying and fastening devices.

The invention consists in various features and details of construction which will be hereinafter more fully pointed out and explained, among which may be mentioned a novel construction and arrangement of gearing and mechanism for imparting motion to and timing the motions of the various parts; a trip of novel construction which is actuated by the pressure of the grain to throw the band applying and fastening devices into operation and to simultaneously throw the packers out of action; a compressor and bundle-discharger connected one with the other, and the former connected with the binder-arm or cord-carrier in a peculiar manner, whereby the parts are caused to move toward each other at certain times to compress the grain, and at other times to separate to permit the escape and cause the discharge of the bundle; a rotary tying-head having the outer jaw grooved to its point or nose, and a stripper arranged to move longitudinally through the slot to the nose or tip of the jaw to insure the stripping of the loop therefrom, said stripper being on the reciprocating cord-guide, and novel means for actuating the knotter. Other features and details will be referred to and explained in the course of the description.

In the accompanying drawings, Figure 1 represents a perspective view of my improved machine or binding mechanism with the grain table or platform removed to show the parts beneath; Fig. 2, a top plan view of the same with the binder-arm and its appendages removed; Fig. 3, a vertical transverse section on the line *x x* of Fig. 2, looking in the direction of arrow marked 1; Fig. 4, a like section looking in the direction of arrow marked 2; Fig. 5, a section on the line *y y*, looking toward the knotter; Fig. 6, a side elevation of the knotter and the wheel which operates the same and other parts; Fig. 7, a face view of the wheel by which the compressor-arm and bundle-discharger are operated through intermediate devices; Fig. 8, a detail view of the cord-holder; Figs. 9, 10, 11, 12, and 13, views illustrating the formation of the knot.

The apparatus is designed to be used as an attachment to any of the harvesting-machines now commonly in use, though of course it may be built into the framing of a harvester especially designed for it.

In the drawings I have represented the mechanism as mounted in a rectangular wooden frame, A; but in practice this may be replaced with a metal frame of special design, which may be made to occupy considerably less space than the frame shown. Within and upon this frame are mounted the various parts, which I will proceed to point out and describe in detail, first observing that the grain is laid upon a table or platform resting upon the top of frame A.

At one end of frame A there is an overhanging arm or bracket, B, through the center of which extends a shaft, C, carrying at its inner end the binder arm or needle D, by which the cord or band *a* is carried about the gavel of grain and to the cord holding, tying, and cutting devices. This arm is grooved on its outer face to permit the binding-cord *a* to lie in it and to be protected by the edges or sides of the groove from contact with the grain or with other bodies. Near the point of the arm is an eye, *b*, through which the cord *a* passes to the inner side of the arm, so that when the arm descends its point shall enter the grain some distance in advance of the cord, and so, also, that the cord may be properly carried to the holder and tyer, as presently explained.

E indicates a tubular shaft encircling the shaft C and passing through the arm or bracket B, as shown in Figs. 1 and 2, and carrying at its inner end a bundle discharger or arm, F, the long arm of which extends downward below the arm or bracket, and a short tail or arm, *c*, of which projects above the bracket and shafts C E, as shown, serving as a support to which to pivot a compressor-arm, G, which is connected by a link, *d*, with the hub or boss of the binder-arm D, eccentrically, as in Fig. 2, so that as the binder-arm descends the compressor G will likewise be drawn down and caused to compress the gavel, and as the binder-arm rises the compressor-arm is likewise caused to rise, swinging away from the binder-arm and leaving the bundle free to be ejected by the discharger F. The movements of the binder-arm, the compressor, and the discharger are, by reason of the connection of said parts, somewhat modified by the individual movements of each other; but the principal movements of said parts are effected by crank-arms $e f$, secured to the outer ends of the respective shafts, C E, which are connected by pitmen or bars $g h$ with similar crank-arms, $i j$, on shafts H I in the base of the frame, and which are actuated at certain intervals, as hereinafter explained.

J indicates an upright trip-arm, which is fast upon a rock-shaft, K, and which, with the compressor-arm G, serves as an abutment or stop against which the grain is pressed and packed until the trip-arm is forced back, and the binding devices proper are thereby thrown into gear and set in motion. The trip-arm shaft K carries at one end an arm, $k$, which connects by a link, $l$, with one end of a pivoted trip, L, which is normally held and drawn down by a spring, $m$. The construction and operation of the trip will be readily understood by reference to Figs. 2 and 3; but it should here be stated that the office of said trip is to release a clutch which it normally holds back away from the hub of a driving-wheel, allowing it to engage therewith and to put in motion the shaft which operates the knotter, cord-holder, and cutter, and through said shaft to operate the shafts H I, which, as above stated, actuate the binder-arm, compressor, and discharger or ejector.

To render the description more clear, I will first explain how motion is given to the binding mechanism primarily, for which purpose I would again refer to Figs. 2 and 3.

M indicates the packer-shaft, formed with cranks $n$ to carry the packers N, the rear ends of which are supported by links $o$, mounted loosely upon the shaft H, so that as the shaft M rotates the packers rise, move forward, fall, and move backward, thereby moving the grain upon the table forward against the trip-arm J and compressor G, as above mentioned. Upon this shaft M is loosely mounted and free to rotate, a chain-wheel, O, which receives motion from the main drive-wheel or other part of the harvester to which it is applied. The chain-wheel is formed with or has secured to it a pinion, P, and a hub, $p$, notched to form one half or section of a clutch, Q, the other half of which is formed upon a sleeve, $q$, which is free to slide upon the shaft M, but is prevented from rotating thereon by a feather or by a pin extending into a slot in the sleeve. So long as grain is to be added to the gavel and the packers remain in action for that purpose the clutch Q is caused to lock the wheel O to the shaft M; but when the gavel is fully made up the clutch is released and the packers cease to operate. The pinion P gears with a gear-wheel, R, which normally runs loose upon a shaft, S, which carries the wheels, cams, and devices for actuating shafts H I, the knotter, cord-holder, and cutter; but a clutch, T, serves to make the wheel R periodically fast to the shaft S, and to cause said shaft to turn with the wheel when required. The clutch T consists of a notched hub, $r$, on the gear-wheel R, or secured thereto, and a sliding sleeve, $s$, mounted and free to move longitudinally upon shaft S, but prevented by a feather or equivalent means from turning independently of the shaft. The sleeve $q$ of clutch Q and the sleeve $s$ of clutch T are both flanged or grooved, as shown in Fig. 2, and the ends of an intermediately-pivoted lever or yoke, U, preferably furnished with anti-friction rollers, work in said grooves or between the flanges, said lever serving, in conjunction with a spring and other devices presently described, to secure the locking of one clutch and unlocking of the other. The purpose of the trip is to bring about the aforesaid action of the clutches. The shaft S makes one complete revolution in operating the knotter and its attendant parts, and when that operation is completed it is desirable that the said shaft should cease its rotation. Hence I provide the sleeve $s$ with a stud, $t$, preferably furnished with a loose roller, and I form upon the face of the trip L an incline, $u$, which, as the shaft S rotates and brings the stud against it, crowds it back, and with it the sleeve $s$, thereby unclutching wheel R and permitting it to run free of the shaft. In thus unclutching, the sleeve $s$, through lever U U', imparts to sleeve $q$ a motion in the reverse direction, causing wheel O and pinion P to be clutched to shaft M, which causes the packers to again go into operation. When the grain accumulates and the pressure against trip-arm J becomes sufficient to force said arm back the trip L is raised above the outer end of stud $t$, allowing a spring, $v$, to force the sleeve $s$ toward the hub $r$, causing the two parts of clutch T to engage, and allowing the parts of clutch Q to disengage, as explained, the lever U being made in two parts, U and U², the latter hinged or jointed to the former, as shown in Figs. 2 and 3, thus permitting the spring $v$ to move the part U² with sleeve $s$ without affecting part U. To insure the engagement of clutch T during the revolution of shaft S, and to disengage clutch Q during that time, I provide the lever or yoke U with an arm, U', perforated to permit the shaft to pass through it, and having a depression, $w$. Upon the shaft S is a stud, $x$, which, when the shaft is stationary and the clutch T is thrown apart, rests in the notch $w$ and permits the clutch Q to be engaged, but as the shaft rotates bears against the arm U and separates the parts of the clutch Q and tends to force and hold the sleeve $s$ over toward the hub $r$. Thus it will be seen that the packers operate until the gavel acquires the required size. Then they cease to operate and the binder-arm applies the band, the knotter and cutter operate, and the bundle is discharged, at which moment shaft S, having completed its revolution, is thrown out of action by the trip L.

Referring now to Figs. 4 and 7, the manner in which shafts H and I are operated will be explained.

V and W represent two wheels secured upon the shaft S, and which may, if desired, be cast in one piece. The wheel V has two short toothed portions, $y$ $z$, separated by an intermediate plain portion, $y'$, on the one side and by a longer plain portion, $z'$, on the other side, a notch or cavity, $a'$, being formed between each of said portions and the next, as more clearly shown in Fig. 4.

A′ indicates a pinion rigidly secured upon the shaft H, and having alternate quarters toothed to mesh with the toothed portions $y$ $z$ of the wheel V, and the intermediate or remaining quarters formed with delay-surfaces, terminating at either side in ears $b'$, which act as cog-teeth projecting into the notches $a'$, and consequently being moved by the wheel V, causing the pinion to rotate through one quarter of a revolution.

The wheel V stops in the position shown in Fig. 4 when thrown out of action by the trip acting upon clutch T, and the ears $b'$, resting upon the delay-surface $y'$, hold the pinion A′, and consequently the shaft H, against rotation. As the wheel V comes into action and begins to rotate, the upper ear or tooth $b'$ enters the notch $a'$, being started into the same by the edge of toothed portion $y$ of wheel V, which projects outward beyond the plain face or delay-surface $y'$, and consequently strikes the ear, causing it to enter the notch, as stated. The ear $b'$ is moved by the wheel V sufficiently to rotate the pinion until the toothed portion $y$ of said wheel is brought into mesh with the toothed portion of pinion A′, which causes the rotation to continue until another ear $b'$ enters a notch, $a'$, on the opposite side of toothed portion $y$ of wheel V, which last engagement causes the pinion A to finish a half-revolution and brings two of the ears $b'$ to bear upon the long delay-surface $z'$, thereby holding the shaft H against rotation until wheel V has revolved far enough to bring the toothed portion $z$ into contact with one of the ears $b'$ of pinion A′, causing a second half-revolution of pinion A′ and shaft H, and leaving the wheel V and pinion A′ in the positions shown in Fig. 4, at which instant the shaft S is unclutched from its driving-wheel through the action of the trip L, moved by the trip-arm J. The crank-arm $i$ of shaft H is connected, as before stated, with crank-arm $e$ of shaft C by a pitman, $g$, said crank-arms standing in such positions relatively to each other that as the pinion A′ describes its first half-revolution the binder-arm D descends, passing through the stream of inflowing grain at a point just in advance of or in line with the packers, carrying the cord beneath the knotter-head X, and to the cord-holder Y, as presently explained in detail. When the binder-arm reaches its lowest point or limit of motion beneath the grain table or platform the pinion A′ is brought to rest by reason of the ears $b'$ resting upon the delay-surface $z'$ of wheel V, thus holding the binder-arm rigidly against motion either up or down. The wheel W, which moves in unison with wheel V, acts upon a pinion, Z, having a single delay-surface, $c'$, the wheel being likewise formed with a single toothed portion, $d'$, and but one delay-face, $e'$. The wheel W is also provided with notches $f'$ at both sides of the toothed portion $d'$, to receive the ears $g'$ of pinion Z, the whole serving to give the pinion and its shaft I one complete rotation, which rotation occurs simultaneously with the second half-revolution of pinion A′, which causes the elevation of the binder-arm. The connections of the shafts I and E through crank-arms $f$ $j$ and pitman $h$ are such that, together with the action of the link $d$, connecting the compressor-arm G and hub of binder-arm D, the compresser-arm is first drawn downward a short distance, compressing the gavel slightly, and is then thrown upward out of the way of the bundle, the ejector or bundle-discharger F following in the same direction to throw out the bundle.

Referring now to Figs. 1, 2, 5, 6, and 8, the cord-holder and cutter will be explained, together with the stripper.

In Fig. 5 the binder-arm is represented in dotted lines in its lowest position, the cord passing through the cord-guide E′ beneath the jaws of the knotter X and between the arms of a clamping wheel or cord-holder, Y. The cord-holder consists of the wheel Y, mounted in a block or support, C′, with sufficient space between the face of the wheel and of the slot or opening in which it turns to permit the cord to be crowded between them by the rotation of the wheel; and, if desired, the face of the slot or space may be supported by springs and adapted to yield in case of excessive pressure, as in the event of knots entering between the plate or block and the wheel. Such arrangement, while insuring the retention of the cord, will prevent the straining or injury of the wheel, which might otherwise happen, or the cutting of the cord by the wheel. After the binder-arm descends and the loop has been formed, as will be explained, the wheel B′ is rotated a short distance by means of a spring hook or dog, $h'$, which engages with a ratchet, $i'$, formed on the side of wheel Y, the dog being attached to a reciprocating block, D′, which has on its under side two studs, $s'$, bearing against opposite sides of a bent or cam rim, G′, of a wheel, F′, which wheel also actuates the knotter X. The cam or bent portion of the rim is at such point in the circumference of the wheel that it withdraws the block D′ just before the knot is finished by stripping the loop from the tying head or jaws, the backward motion of said block causing the dog $h'$ to turn the ratchet-wheel, and with it the wheel Y. As the block and dog $h'$ return or move forward, the dog rides over one or more of the teeth of the ratchet $i'$, and engages with a fresh tooth thereof preparatory to another backward movement, the wheel Y and its ratchet $i'$ being held against backward rotation by a dog or pawl, $l'$, which engages with the latter, as shown in dotted lines in Fig. 8.

The cutter by which the band is severed consists of a stationary blade, $m'$, and a moving blade, $n'$, the latter secured to and moving with the block D'. The two strands of cord from the bundle pass beneath the cutter, which, just as the knotter completes its revolution and the jaws close upon the two strands of the applied band, opens by reason of the movement of block D', allowing the strands to enter, whereupon the blade $n'$ moves past the blade $m'$ and severs both strands at a point between the cord-holder and the knotter. As the cutter opens, the cord-holder or wheel Y, being rotated, carries the second strand, or that passing from the binder-arm, into the clamping-space, thus making said end fast, so that as the binder-arm again rises it will draw off from the ball or reel a proper amount of cord for the next band, leaving the new end clamped in the cord-holder Y. This operation being repeated at each descent of the binder-arm insures the holding of the new end for each band. When the binder-arm is elevated the cord is passed through a notched plate or guide, E', to the lower side of which is secured or upon which is formed a stripper tooth or finger, $o'$. The grain, being delivered to the machine and forced in by the packers N, presses back the cord until the grain bears against the trip-arm J and compressor-arm G, and when this pressure becomes sufficient the arm J is forced back, the trip L is actuated, and the binder-arm descends, carrying the band around the gavel and laying the new strand into the wheel Y, preparatory to its next partial rotation by the dog $h'$. It will of course be seen that the strands are laid in different notches of the wheel Y, as is customary in this class of holders. When the binder-arm reaches its lowest position, as in dotted lines, Fig. 5, the knotter begins its operation, the two strands of the band extending, as above explained, beneath the jaws $p'$ $q'$ of the knotter, one from the guide-plate E' to the cord-holder, the other from said plate to the binder-arm, as indicated.

The operation of forming the knot will be more readily understood by referring to Figs. 9 to 13. In Fig. 9 the single strand is shown passing beneath the jaws $p'$ $q'$, one end passing to the holder Y, the other to the gavel. As the binder-arm descends it carries the second strand beneath the jaws, as in Fig. 10, and then the jaws, and, in fact, the entire knotter, rotate, carrying the strands before them until the curved or cam face $r'$ causes the strands lying between the knotter and the holder to ride upward across the top of the tyer, thus forming the loop, as in Fig. 11. During the last quarter, or thereabout, of the revolution of the tyer-head the lower jaw, $q'$, is opened away from jaw $p'$, as in Fig. 11, and the two strands, passing respectively to the binder-arm and to the holder Y, are received between the jaw, which, just at the completion of the revolution, close firmly upon the strands and retain them until the knot is completed by the stripper pushing off the loop from the jaws over the ends held thereby, as in Fig. 13, and the knot is drawn tight and the ends pulled from between the jaws by the guide-plate, the ejector then striking the bundle and throwing it outward away from the binding-arm. Just before the loop is stripped from the jaws, however, the block D' moves backward, opening the cutter, and allowing both strands to enter, and also rotating the cord-holder or wheel Y, causing it to clamp the cord extending from the binder-arm to the knotter, as before explained. The cutter then acts upon the two strands, severing them and leaving the ends of the applied band in the jaws of the knotter. The stripper and cord-guide are then caused to move forward by reason of two studs or rollers, $j'$, on the lower side of the guide-plate, straddling or bearing against opposite faces of the cam-wheel rim or ring secured on shaft S and attached to or formed with wheel F'. The stripper-finger $o'$ and the cord-guide E' move together, the finger extending downward into a groove, $t$, in the upper jaw, $p'$, of the knotter and stripping the loop therefrom with certainty. The loop being thus thrown from the jaws and the ends of the applied band being still retained thereby, the knot is drawn tight, and the ends finally drawn from the jaws by the further movement of the guide-plate.

I do not broadly claim a grooved rotary knotter or a stripper working in said groove; but I do claim the combination of said parts when the stripper is attached to a longitudinally-sliding guide-plate, as explained.

The knotter consists of an upright shank or stem, $u'$, having the jaw $p'$ and the curved tail or cam $r'$ formed upon its upper end, while its lower end is furnished with a pinion, $v'$, which has a delay-surface or bearing-face, $w'$, and is actuated by gear-teeth $x'$ on the face of wheel F' at the proper time, the bearing-face $w'$ of the pinion resting at other times against the delay-face $y'$ of the wheel F'', and being thereby held against rotation; and it further consists of a pivoted jaw, $q'$, the rear end or portion of which is bent downward and outward, and carries an anti-friction roller, $z^2$, which, during the last quarter of the revolution of the knotter, rides upon a fixed cam, $a^2$, and opens the jaw $q'$ away from the upper jaw, $p'$, as above mentioned. At all other times the jaws remain closed, and in order that they may be prevented from opening, the roller $z'$ is caused to project under an overhanging or projecting flange, $b^2$, on the face of wheel F' while at rest, and to pass beneath the binder-arm while rotating, until it comes to cam $a^2$, upon which it rides, as stated.

Figure 10:
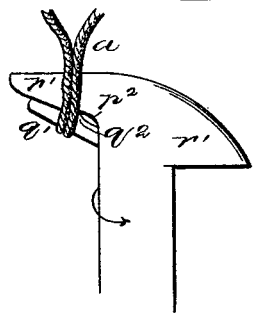
Figure 11:
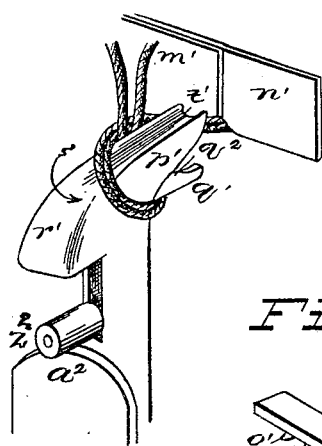
Figure 12:
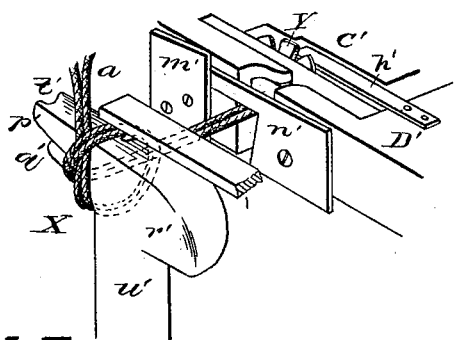
Figure 13:
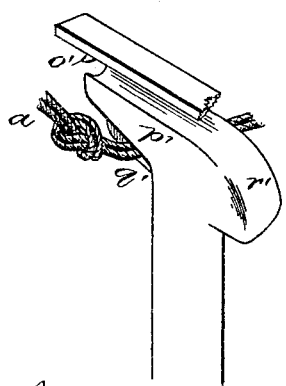

As will be seen in Figs. 9 and 10, the upper jaw, $p'$, is formed with a depression or recess, $p^2$, to insure the holding of the strands close back to the shank or stock of the tying-head, and the lower jaw, $q'$, is formed with a shoulder or projection, $q^2$, to fit said cavity, sufficient space being left, however, to receive the strands in a compressed condition, or, in other words, to allow the jaws to close firmly upon and hold them without separating the jaws at the outer end.

I am aware that a trip actuated by the pressure of the grain is not broadly new, and that two tubular shafts have been mounted upon a common rod or shaft extending entirely across the machine, the tubular shafts occupying different portions of the length of the rod or sustaining-shaft. Such matters I do not claim, except in the form or construction explained.

Having thus described my invention, what I claim is—

1. In a grain-binder, the combination of a binder-arm, D, carried by a shaft, C, an ejector, F, carried by a tubular shaft, E, encircling shaft C, and a compressor-arm, G, pivoted to the tail $c$ of the ejector and eccentrically connected with the binder-arm by a link, $d$, substantially as and for the purpose set forth.

2. In combination with shaft C, carrying binder-arm D, and with shaft E, carrying arms F G, means, substantially such as shown and described, for imparting motion to said shafts independently and at stated intervals, for the purpose explained.

3. In combination with shaft C, carrying the binder-arm D and provided with crank-arm $e$, and the shaft E, carrying arms F G, and provided with crank-arm $f$, shafts H I, having arms $i\,j$, pitmen $g\,h$, and means, substantially such as shown and described, for imparting motion to the shafts H I.

4. The combination of shaft H, provided with pinion A′, of the form shown, and connected with binder-arm shaft C, substantially as shown and described, shaft I, provided with pinion Z, of the form shown, connected by a link, $d$, with the binder-arm, and wheels V W, arranged to actuate the pinions A′ Z, substantially as set forth and shown.

5. In combination with the packer-shaft M, having wheel O, pinion P, and clutch Q, the binder mechanism, shaft S, having clutch T and the stud $x$, and the pivoted yoke or lever U U², connecting the two clutches, and having arm U′, provided with depression $w$, said parts being combined and operating substantially as described and shown, whereby the stud $x$ causes the clutch Q to disengage when the shaft S starts, and during the rotation of said shaft S maintains the engagement of clutch T and the disengagement of clutch Q.

6. In combination with binder mechanism, shaft S, having stud $x$, and with spring-pressed sleeve $s$ of clutch T, pivoted arm or lever U U², connected with sleeve $s$, and provided with arm U′, having depression $w$.

7. In combination with wheel F′, having flange $b^2$ and teeth $x'$, and with stationary cam $a^2$, the knotter X, having fixed jaw $p'$, pivoted jaw $q'$, provided with roller $z'$, all substantially as shown and described.

8. In combination with a grooved knotter, a reciprocating guide-plate carrying a stripping-finger, and arranged to move directly over or past the outer jaw of the knotter in the direction of the length of the latter, as and for the purpose explained.

9. In a grain-binder, the combination of a cord holder and clamp, consisting of a wheel, Y, mounted in a stationary block, C′, and having ratchet $i'$ and dog or pawl $l'$, and the sliding block D′, provided with spring hook or dog $h'$.

10. In combination with block C′, having wheel Y and blade $n'$, the sliding block D′, having spring hook or dog $h'$, and blade $m'$.

11. In a grain-binder, the combination of shafts M S, wheels O P R, clutches Q T, connected substantially as described and shown, trip L, connected with trip-arm J, wheels V, W, F′, and G, mounted upon shaft S, guide-plate E, having stripper-finger $o$, knotter X, cord-holder Y, cutter $m'\,n'$, shafts H I, carrying pinions A′ Z, and shafts C E, carrying arms D F G, and connected with shafts H I, substantially as shown and described.

PETER J. OLSON.

Witnesses:
WILLIAM W. DODGE,
GEO. F. GRAHAM.